(12) United States Patent
Pomerleau et al.

(10) Patent No.: US 7,850,855 B2
(45) Date of Patent: Dec. 14, 2010

(54) METHODS OF UTILIZING RECYCLED RUBBER

(75) Inventors: Daniel Guy Pomerleau, Calgary (CA); Kenneth William Gibbs, Calgary (CA)

(73) Assignee: Engineered Drilling Solutions Inc. (CA)

( * ) Notice: Subject to any disclaimer, the term of this patent is extended or adjusted under 35 U.S.C. 154(b) by 0 days.

(21) Appl. No.: 12/466,800

(22) Filed: May 15, 2009

(65) Prior Publication Data

US 2009/0250399 A1 Oct. 8, 2009

Related U.S. Application Data

(63) Continuation of application No. PCT/CA2007/002087, filed on Nov. 15, 2007.

(60) Provisional application No. 60/866,216, filed on Nov. 17, 2006.

(51) Int. Cl.
*B01D 15/04* (2006.01)
(52) U.S. Cl. .................... 210/690; 210/922; 210/923; 210/924; 210/925
(58) Field of Classification Search ................ 210/690, 210/922–925
See application file for complete search history.

(56) References Cited

U.S. PATENT DOCUMENTS 3,567,660 A  3/1971 Winkler 4,187,187 A * 2/1980 Turbeville ................ 252/62.54
5,236,597 A  8/1993 Feist et al.
2005/0252861 A1 * 11/2005 Lin ............................ 210/671

FOREIGN PATENT DOCUMENTS

| CA | 2578318 | A1 | 5/2007 |
| GB | 2420725 | A  | 6/2006 |
| WO | 9105738 | A1 | 5/1991 |
| WO | 9214002 | A1 | 8/1992 |

OTHER PUBLICATIONS

Aisien, et al. "Comparative Absorption of Crude Oil from Fresh and Marine Water Using Recycled Rubber"; Journal of Environmental Engineering, vol. 132, No. 9, pp. 1078-1081; Sep. 2006.
International Preliminary Report on Patentability & Written Opinion of the International Searching Authority; PCT/CA2007/002087; May 19, 2009; 5 pages.
International Search Report; PCT/CA2007/002087; Feb. 19, 2008; 3 pages.
Aisien, et al.; "Potential Application of Recycled Rubber in Oil Pollution Control"; Environmental Monitoring and Assessment, vol. 85, No. 2, pp. 175-190; 2003.

* cited by examiner

*Primary Examiner*—Chester T Barry
(74) *Attorney, Agent, or Firm*—St. Onge Steward Johnston & Reens LLC

(57) ABSTRACT

The present invention relates to methods of using recycled rubber including recycled rubber from tires to absorb hydrocarbons. The method is particularly applicable to absorbing waste or contaminating hydrocarbons from solid surfaces or particles where hydrocarbons may have been spilt or otherwise have contaminated the surfaces. The methods may also be used for removing spilt hydrocarbons from a liquid such as crude oil spills at sea.

16 Claims, No Drawings

METHODS OF UTILIZING RECYCLED RUBBER

CROSS-REFERENCE TO RELATED APPLICATIONS

The present application is a continuation of pending International patent application PCT/CA2007/002087 filed on Nov. 15, 2007 which designates the United States and claims priority from U.S. provisional patent application 60/866,216 filed on Nov. 17, 2006, the content of which is incorporated herein by reference.

FIELD OF THE INVENTION

The present invention relates to methods of using recycled rubber including recycled rubber from tires to absorb hydrocarbons. The method is particularly applicable to absorbing waste or contaminating hydrocarbons from solid surfaces or particles where hydrocarbons may have been spilt or otherwise have contaminated the surfaces. The methods may also be used for removing spilt hydrocarbons from a liquid such as crude oil spills at sea.

BACKGROUND OF THE INVENTION

In the past, cleaning hydrocarbons from liquids and solid surfaces has been difficult. For example, cleaning hydrocarbons coating or contaminating other materials has typically entailed the addition of surfactants to disperse the hydrocarbons followed by dilution in a carrier solution such as water. Other methods, for example cleaning oil spills at sea and/or on land oil spills, have used materials such as sawdust, peat or similar organic materials that adsorb the hydrocarbons creating a mass which can be collected and transported to land fill sites. In these cases, the handling of the cleaning solutions or absorbing materials is difficult and requires that the cleaning solutions and absorbing materials also be handled and disposed of at an alternative site.

In the more specific case of drill cuttings, the disposal of hydrocarbon contaminated drill cuttings (hereinafter "drill cuttings") has been a significant issue for drill site operators. For example, in a typical drilled well in the oil industry, upwards of 100 m$^3$ of drill cuttings may be produced from a single well. Typical drill cuttings may also contain a variety of contaminants including hydrocarbons, salts, metals, soaps and other agents that may have been added to the drilling fluid to assist in the drilling and hydrocarbon recovery processes or become mixed with the drilling fluid from the formation.

In a typical drilling process, recovered and dried drill cuttings may include approximately 15% (w/w) hydrocarbon contaminants that may range in viscosity from highly viscous bitumens to less viscous lighter fractions.

Acceptable methods of disposal of drill cuttings are usually dictated by various jurisdictional regulations and will usually require that the drill cuttings are properly remediated into the local soil or alternatively, removed to a landfill site. Current methods for adsorbing or absorbing free oil prior to remediation include mixing the drill cuttings with sawdust or peat moss. Typically, volume ratios of 2:1 for sawdust (sawdust/drill cuttings) and 1.5:1 for peat moss (peat moss/drill cuttings) have been used to effectively stabilize contaminated drill cuttings. However, using such absorbents creates a sizable volume of waste to be transported to and contained at a disposal site.

Moreover, such disposal methods may lead to certain environmental contamination as the various contaminants may ultimately leach into the local groundwater, particularly as materials such as sawdust or peat decomposes. As well, as noted, the cost of transportation of drill cuttings to a landfill and/or the cost of soil remediation is significant.

As a result, there has been a need for effective disposal methods wherein oil contaminated surfaces can be effectively and efficiently cleaned in a manner that provides both effective cleaning and simplified disposal of the oil contaminant. In the particular case of drill currings, there has been a need for method wherein the drill cuttings are either stabilized or disposed of in a manner that meets environmental regulations, that provides an effective method of minimizing environmental contamination by waste drill cuttings, that does not increase the overall cost of disposing of drilling cuttings and that may provide a way of effectively recovering spilt hydrocarbons. More specifically, there has been a need for a process to stabilize drilling cuttings and/or a disposal method in which drill cuttings provide a useful product in other applications such as a road wherein the contaminants may be encapsulated or incorporated with other materials to reduce the likelihood of the contaminants leaching to the environment as well as providing useful and beneficial properties in those other applications.

In addition, recovery of spilt hydrocarbons from other contaminated surfaces has also been problematic due to the cost and complexity of various hydrocarbon recovery processes. As a result, there has been a need for new methods of recovering spilt hydrocarbons from a variety of surfaces including both liquid and solid surfaces where the recovered hydrocarbons can in some applications be recycled.

SUMMARY OF THE INVENTION

In accordance with the invention, there is provided a method of capturing hydrocarbons contaminating solid surfaces or liquids. In particular the blending or addition of rubber crumb from recycled tires, or waste asphalt shingle particles, together or separately into or onto such surfaces or liquids is described. The rubber crumb and asphalt shingles are used absorb the contaminating hydrocarbons creating a high viscosity mass that may be readily handled or collected using conventional earth moving equipment such as backhoe or shovel, by skimming or vacuuming equipment or other equipment.

In accordance with another embodiment, the invention describes a hydrocarbon collecting system including a porous net-like or mesh material for containing rubber crumb and/or waste asphalt shingle particles that can be used as an effective means of absorbing surface contaminating hydrocarbons so as to improve the material handling properties of the contaminant and absorbent. Improving the material handling properties of the contaminant and absorbent may allow for direct collection for transport to a remediation facility for refining, to an asphalting facility for further processing or to a landfill disposal site.

In accordance with a more specific embodiment, the invention provides a method of stabilizing a surface or surfaces contaminated with hydrocarbons comprising mixing an effective amount of recycled rubber with the surface or surfaces to promote absorption of the hydrocarbon within the recycled rubber and form an absorption product. The recycled rubber may be rubber crumb wherein the ratio of hydrocarbon:rubber crumb is up to 9:1 (w/w). The rubber crumb may be 10-325 mesh.

A crosslinking agent may be added to the absorption product to promote crosslinking within the absorption product.

In yet embodiment, the surface is a liquid surface and the rubber crumb is sprayed over the surface to create the absorption product and the absorption product is removed from the liquid surface by skimming, vacuum or other mechanical means. In another embodiment, the rubber crumb is added to a porous bag and preferably a floating porous bag for placement on the liquid surface to promote formation of the absorption product within the porous bag. In yet another embodiment, the rubber crumb is used to form stabilized drill cuttings.

DETAILED DESCRIPTION OF THE INVENTION

In accordance with the invention, methods of effectively utilizing recycled rubber (mainly rubber crumb) and asphalt shingle particles are described for stabilizing drill cuttings and otherwise for effectively absorbing hydrocarbons from different surfaces. In particular, the use of rubber crumb from recycled tires, (often referred to as Vitron rubber), has been found to be effective in absorbing hydrocarbons in a variety of applications. In particular, rubber crumb having a size of 10-325 mesh (preferably 10-30 mesh) has been found to be highly effective in absorbing hydrocarbons from a number of contaminated surfaces.

The main applications of blending rubber crumb with oil contaminated materials, as will be described below, include a) stabilizing hydrocarbon contaminated drill cuttings and b) absorbing spilt hydrocarbons on liquid or solid surfaces.

In accordance with the invention, spilt hydrocarbons can be effectively absorbed within rubber crumb when rubber crumb is blended with the contaminated material at a hydrocarbon: crumb ratio (HC:crumb) up to 9:1 (w/w), said ratio depending on the specific application, the total quantity of hydrocarbon, the type of contaminated surface and its surface area and/or the desired properties of the resulting absorption product. For example, where a more viscous absorption product is desired the ratio is lowered, and if a less viscous absorption product is desired, a higher ratio is used.

In certain applications, such as absorbing spilt hydrocarbons on a liquid surface, 10-30 mesh size rubber crumb at a 4.5:1 HC:crumb ratio has been found to be particularly effective from both an end viscosity and speed of process and materials handling perspective. In this application, at these ratios, application of rubber crumb to the liquid surface, such as water containing a contaminating hydrocarbon, results in rapid creation of a gelatinous absorption product that can be readily removed from the liquid surface by various techniques and known equipment including mechanical shovels, skimming or vacuum.

In other embodiments, the addition of cross linking agents may also be effective in the ability to stabilize the absorption product by increasing its viscosity to enable handling by particular collection equipment. For example, the addition of difunctional amines under conditions to promote cross-linking may be used to initiate cross-linking between adjacent polymeric chains within the crumb. Resin cure systems including alkyl phenol-formaldehyde derivatives may also be used in particular applications to promote carbon-carbon cross-links and more stable compounds.

With contaminated solid materials, including both granular and larger more cohesive materials, onto which hydrocarbons may have been spilt; application of rubber crumb is also effective in creating stabilized masses of hydrocarbon and crumb or hydrocarbon, crumb and granular material. Selection of the particular ratio of hydrocarbon to crumb for the contaminated material may be varied given the particular contamination involved and the specific properties of the resulting product that may be desired.

For example, in the case of oil contaminated drill cuttings, the addition of rubber crumb to drill cuttings within a sluice box effectively produces an absorption product that can be used in downstream applications and as a method of stabilizing the drill cuttings for disposal.

Other applications include applying rubber crumb at an appropriate ratio to a hydrocarbon spill on a non-liquid surface like a road, or organic surface (a field) which after absorption can permit simple collection of the absorption product by sweeping, or shovelling the absorption product and subsequent collection into a transportable container.

In the particular case of an oil spill on a water surface, rubber crumb may spread over the contaminated water to absorb hydrocarbon and thereafter be removed by known boom or vacuum technologies. In a specific embodiment, rubber crumb may be contained within a porous floating bag that is spread over the contaminated water to absorb the hydrocarbons in order to further facilitate collection and removal of the absorption product. In this case, a suitable quantity of rubber crumb is placed inside a sealable porous bag having a pore structure smaller that the rubber crumb particle size. The combined bag and rubber crumb may be placed over the contaminated surface such that hydrocarbon passes through the bag to become absorbed within the rubber crumb. By virtue of the bag structure, the bag having absorbed the contaminating hydrocarbons may be easily removed from the surface for disposal.

The above-described embodiments of the invention are intended to be examples only. Alterations, modifications and variations may be effected to the particular embodiments by those of skill in the art without departing from the scope of the invention which is defined by the following claims.

What is claimed is:

1. A method of stabilizing a surface contaminated with hydrocarbons comprising:
   mixing an effective amount of recycled rubber with the surface to promote absorption of the hydrocarbon within the recycled rubber and to form an absorption product: and
   adding a crosslinking agent to the absorption product to promote crosslinking within the absorption product.

2. The method as in claim 1 wherein the recycled rubber is rubber crumb.

3. The method as in claim 2 wherein the ratio of hydrocarbon:rubber crumb is up to 9:1.

4. The method as in claim 2 wherein the rubber crumb is 10-325 mesh.

5. The method as in claim 4 wherein the rubber crumb is 10-25 *mesh*.

6. The method as in claim 2 wherein the surface is a liquid surface and the rubber crumb is sprayed over the surface to create the absorption product and the absorption product is removed from the liquid surface by skimming, vacuum or other mechanical means.

7. The method as in claim 2 wherein the surface is a liquid surface and the rubber crumb is added to a floating porous bag for placement on the liquid surface to promote formation of the absorption product within the floating porous bag.

8. A method of stabilizing a surface contaminated with hydrocarbons comprising mixing an effective amount of recycled rubber with the surface to promote absorption of the hydrocarbon within the recycled rubber and to form an absorption product wherein the surface is a granular surface.

9. The method as in claim 8 wherein the granular surface is drill cuttings.

10. The method as in claim 9 wherein the recycled rubber is rubber crumb and the rubber crumb is used to form stabilized drill cuttings.

11. The method as in claim 10 wherein the degree of hydrocarbon contamination of the drill cuttings is less than 15% (hydrocarbon/drill cuttings).

12. The method as in claim 10 wherein the degree of hydrocarbon contamination of the drill cuttings is 7-15% (hydrocarbon/drill cuttings).

13. A method of collecting contaminating hydrocarbons from solid surfaces or liquids comprising the steps of mixing, or adding rubber crumb or crushed asphalt shingles or a combination thereof to the hydrocarbon-contaminated surface or liquid.

14. The method as in claim 1 wherein a sufficient amount of rubber crumb or crushed asphalt shingles or a combination thereof is added to a solid or liquid to create an optimized viscosity or consistency of the resulting mixture to allow for collection of the contaminating hydrocarbon using a mechanical collection system.

15. The method as in claim 1 wherein the crosslinking agent is a difunctional amine, and the crosslinking agent is incubated with the absorption product under conditions to promote cross-linking within the absorption product.

16. The method as in claim 1 wherein the crosslinking agent is an alkyl phenol-formaldehyde derivative and the crosslinking agent is incubated with the absorption product under conditions to promote cross-linking within the absorption product.

* * * * *